(12) United States Patent
Brown (10) Patent No.: US 11,723,355 B2
(45) Date of Patent: Aug. 15, 2023

(54) BURROWING ANIMAL TRAPS

(71) Applicant: Thomas Alfred Brown, Calgary (CA)

(72) Inventor: Thomas Alfred Brown, Calgary (CA)

( * ) Notice: Subject to any disclaimer, the term of this patent is extended or adjusted under 35 U.S.C. 154(b) by 523 days.

(21) Appl. No.: 16/656,980

(22) Filed: Oct. 18, 2019

(65) Prior Publication Data

US 2020/0138008 A1    May 7, 2020

Related U.S. Application Data

(60) Provisional application No. 62/754,335, filed on Nov. 1, 2018.

(51) Int. Cl.
*A01M 23/20* (2006.01)

(52) U.S. Cl.
CPC .................. *A01M 23/20* (2013.01)

(58) Field of Classification Search
CPC ...... A01M 23/18; A01M 23/16; A01M 23/20; A01M 23/08; A01M 23/00; A01M 23/02; A01M 23/14
USPC .......... 43/61, 60, 58, 85, 80, 64–67
See application file for complete search history.

(56) References Cited

U.S. PATENT DOCUMENTS

| | | | | |
|---|---|---|---|---|
| 123,807 A | * | 2/1872 | Bowman ............... | A01M 23/18 43/61 |
| 443,970 A | * | 12/1890 | Best ...................... | A01M 23/18 43/61 |
| 619,566 A | * | 2/1899 | Hall ...................... | A01M 21/00 43/65 |
| 824,246 A | * | 6/1906 | Jones .................... | A01M 23/24 43/85 |
| 866,987 A | * | 9/1907 | Turner .................. | A01M 23/18 43/61 |
| 879,010 A | * | 2/1908 | Schmitt ................ | A01M 23/36 43/79 |
| 1,011,207 A | * | 12/1911 | Kemp ................... | A01M 23/18 43/61 |
| 1,158,185 A | * | 10/1915 | Danielson ............ | A01M 23/18 43/61 |
| 1,275,993 A | * | 8/1918 | Spangler .............. | A01M 23/30 43/81 |

(Continued)

FOREIGN PATENT DOCUMENTS

| | | | | |
|---|---|---|---|---|
| DE | 959863 C | * | 3/1957 | ............ A01M 23/18 |
| DE | 1228847 B | * | 11/1966 | ............ A01M 23/20 |

(Continued)

OTHER PUBLICATIONS

Translation of WO 2018/072990 A1 (Year: 2018).*

(Continued)

*Primary Examiner* — Darren W Ark
(74) *Attorney, Agent, or Firm* — Kirton McConkie; Brian Tucker (57) ABSTRACT

An animal trap is configured to enclose the entrance to a burrow and appear to the animal as an extension of the burrow. As a result, the animal will be likely to enter the animal trap under the mistaken belief that it is exiting the burrow. The animal trap may include a main body and a cage floor that define a capture area. The main body is designed to form a pathway into the capture area which is downwardly oriented so that the trap can be placed directly overtop the burrow opening.

20 Claims, 9 Drawing Sheets

(56) References Cited

U.S. PATENT DOCUMENTS

| | | | | |
|---|---|---|---|---|
| 1,362,695 A * | 12/1920 | Hedberg | A01M 23/18; 43/61 |
| 1,483,644 A * | 2/1924 | Rose | A01M 23/00; 43/78 |
| 1,538,308 A * | 5/1925 | Taylor | A01M 23/00; 43/58 |
| 1,584,091 A * | 5/1926 | Harker | A01M 23/00; 43/71 |
| 1,592,397 A * | 7/1926 | Vail | A01M 23/18; 43/69 |
| 1,641,062 A * | 8/1927 | Bacon | A01M 23/00; 43/78 |
| 1,643,602 A * | 9/1927 | Boerner | A01M 23/34; 43/85 |
| 1,686,432 A * | 10/1928 | Bleck | A01M 23/00; 43/61 |
| 1,709,199 A * | 4/1929 | Thayer | A01M 23/30; 43/81 |
| 1,727,083 A * | 9/1929 | Sudds | A01M 23/00; 43/85 |
| 1,844,739 A * | 2/1932 | Austin | A01M 23/00; 43/61 |
| 1,846,851 A * | 2/1932 | Dodge | A01M 23/18; 43/65 |
| 1,913,823 A * | 6/1933 | Witte | A01M 23/18; 43/61 |
| 1,937,260 A * | 11/1933 | Young | A01M 23/00; 43/61 |
| 1,972,641 A * | 9/1934 | Barrett | A01M 23/00; 43/80 |
| 1,992,353 A * | 2/1935 | Cattanach | A01M 23/30; 43/81 |
| 2,059,355 A * | 11/1936 | Hurst | A01M 23/00; 43/69 |
| 2,225,251 A | 12/1940 | Andrick | |
| 2,278,117 A * | 3/1942 | Perinelli | A01M 23/24; 43/61 |
| 2,555,641 A * | 6/1951 | Goldsmith | A01M 23/20; 43/76 |
| 2,638,700 A * | 5/1953 | Nantt | A01M 23/36; 43/80 |
| 3,114,985 A * | 12/1963 | Killinger | A01M 23/16; 43/83.5 |
| 3,769,742 A * | 11/1973 | Spain | A01M 23/30; 43/81 |
| 4,030,230 A * | 6/1977 | Souza | A01M 23/30; 43/81 |
| 4,187,634 A * | 2/1980 | Kintz | A01M 23/20; 43/61 |
| 4,310,984 A * | 1/1982 | Brubaker, Jr. | A01M 23/20; 43/61 |
| 4,779,374 A * | 10/1988 | Feldman | A01M 23/30; 43/81 |
| 4,854,073 A * | 8/1989 | Ball | A01M 23/36; 43/75 |
| 5,345,710 A * | 9/1994 | Bitz | A01M 23/20; 43/61 |
| 5,367,820 A * | 11/1994 | Lafforthun | A01M 23/02; 43/60 |
| 5,615,514 A * | 4/1997 | Meade, Jr. | A01M 23/20; 43/61 |
| 5,673,509 A * | 10/1997 | Gatewood, Jr. | A01M 23/005; 383/106 |
| 5,943,813 A * | 8/1999 | Wang | A01M 23/18; 43/61 |
| 6,101,761 A * | 8/2000 | Sprick | A01M 23/265; 43/85 |
| 7,069,688 B2 * | 7/2006 | Hill | A01M 23/30; 43/80 |
| 7,088,251 B2 * | 8/2006 | Weilbacher, Jr. | A01M 31/002; 119/650 |
| 7,980,023 B2 * | 7/2011 | Nelson | A01M 25/004; 43/67 |
| 8,418,396 B2 * | 4/2013 | Moustirats | A01M 31/002; 43/61 |
| 9,743,658 B1 * | 8/2017 | Walsh | A01M 25/004 |
| 10,512,258 B2 * | 12/2019 | Baxter | A01M 23/08 |
| 2004/0088903 A1 * | 5/2004 | Poche | A01M 25/004; 43/61 |
| 2006/0053682 A1 * | 3/2006 | Goldstein | A01M 1/10; 43/67 |
| 2012/0117853 A1 * | 5/2012 | Studer | A01M 23/08; 43/67 |
| 2013/0160349 A1 * | 6/2013 | Rodgers | A01M 23/10; 43/60 |
| 2014/0020278 A1 * | 1/2014 | Smith | A01M 27/00; 43/79 |
| 2020/0178514 A1 * | 6/2020 | Schurman | A01M 23/30 |

FOREIGN PATENT DOCUMENTS

| | | | | |
|---|---|---|---|---|
| EP | 259823 A2 * | 3/1988 | | |
| EP | 3289871 A1 * | 3/2018 | | A01M 23/38 |
| JP | 11289958 A * | 10/1999 | | |
| JP | 2014180219 A | 9/2014 | | |
| KR | 100824680 B1 * | 4/2008 | | |
| WO | WO-2018072990 A1 * | 4/2018 | | A01M 23/02 |

OTHER PUBLICATIONS

Safeguard, Safeguard Universal Raccoon, Opossum, Skunk, Woodchuck Trap 53000, website, Aug. 6, 2015, Amazon, https://www.amazon.com/Safeguard-Universal-Raccoon-Woodchuck-53000/dp/B00N43Q1JO/ref=sr_1_1?keywords=universal+burrowing+animal+trap&qid=1576458943&sr=8-1#customerReviews.

* cited by examiner

BURROWING ANIMAL TRAPS

CROSS-REFERENCE TO RELATED APPLICATIONS

This application claims the benefit of and incorporates by reference U.S. Provisional Patent Application No. 62/754,335 which was filed on Nov. 1, 2018.

BACKGROUND

For responsible property management, many jurisdictions require property owners and institutions to control specified animal pests. Even without compulsion, property owners may desire to rid their properties of unwanted pest species whether for their own reasons or as a courtesy to neighbors. Animal pests may be primarily an aesthetic concern but may also present health and safety concerns.

Different solutions exist for control animal pests including, for example, devices that repel, harm, kill or capture the animals. While it is generally accepted as a positive goal to avoid unnecessary harm to animals, harming or killing animals is at times seen as a necessary solution. Otherwise, repelling animals may work for some species but for others a more effective solution may be capture. Once captured, animals may be released to the wild in a different location or may be otherwise disposed of.

Animal traps intended for live capture exist but have limited effectiveness on burrowing animals. Many conventional live animal traps rely on bait to attract the animals into an enclosure. However, due to the unfamiliar appearance of such traps, including for example an unnatural floor, the animals are often frightened away. Additionally, attracting animals into an enclosure can take time and is dependent on the animal's appetite and preference for the bait. Moreover, the bait may attract unintended species which may trigger the trap thereby preventing it from capturing the intended specifies until the trap is reset. These unintended species may even be harmed or killed by the trap.

Even when a trap successfully captures an animal, additional problems exist. For example, many individuals may be scared of or repulsed by the captured animal. Also, many traps have gaps that may allow the captured animal to bite an individual while handling the trap or may expose the individual to unwanted contact with the captured animal. Furthermore, traps may be difficult or dangerous to set. These additional problems may discourage individuals from employing otherwise effective traps.

When animals are captured, there is still a risk that the captured animals may be harmed (e.g., due to wind, sun, rain, extreme temperatures, other predatory animals, etc.) before they can be removed from the traps. Also, when a vehicle is used to transfer captured animals to other locations for release, the vehicle will likely become contaminated with soil or feces.

BRIEF SUMMARY

The present invention extends to animal traps that can be used to capture burrowing animals. An animal trap configured in accordance with embodiments of the present invention is designed to enclose the entrance to a burrow and appear to the animal as an extension of the burrow. As a result, the animal will be likely to enter the animal trap under the mistaken belief that it is exiting the burrow.

In some embodiments, a burrowing animal trap can include a main body having an outer surface, an inner surface and an edge that separates the outer surface from the inner surface. The inner surface forms a downwardly-oriented concave interior of the main body when the edge is oriented downwardly. The edge defines an opening into the concave interior. The main body has a first end and a second end opposite the first end. The burrowing animal trap can also include a cage floor that is coupled to the main body over the concave interior. The cage floor extends from the second end of the main body towards the first end of the main body to thereby divide the concave interior into a capture area towards the second end of the main body and a pathway into the capture area towards the first end of the main body. The burrowing animal trap can further include a capture mechanism that includes a trap door that transitions between a set position in which the trap door does not block the pathway into the capture area and a triggered position in which the trap door blocks the pathway into the capture area.

In some embodiments, a burrowing animal trap can include a main body having an outer surface, an inner surface and an edge that separates the outer surface from the inner surface. The inner surface forms a downwardly-oriented concave interior of the main body when the edge is oriented downwardly. The main body has a first end and a second end opposite the first end. The burrowing animal trap can also include a cage floor coupled to the main body over the concave interior. The cage floor has a first end and a second end. The second end of the cage floor is positioned at the second end of the main body. The first end of the cage floor is spaced away from the first end of the main body to thereby divide the concave interior into a capture area towards the second end of the main body and a pathway into the capture area towards the first end of the main body. The edge of the main body and the first end of the cage floor define a downward facing opening to the pathway. The burrowing animal trap further includes a capture mechanism that includes a trap door that transitions between a set position in which the trap door does not block the pathway into the capture area and a triggered position in which the trap door blocks the pathway into the capture area.

In some embodiments, a burrowing animal trap can include a main body having an outer surface, an inner surface and an edge that separates the outer surface from the inner surface. The inner surface forms a downwardly-oriented concave interior of the main body when the edge is oriented downwardly. The main body has a first end and a second end opposite the first end. The main body is formed of an opaque material that prevents light from passing into the concave interior. The main body has an opening at the second end that allows light to pass into the concave interior. The burrowing animal trap also includes a cage floor coupled to the main body over the concave interior. The cage floor has a first end and a second end. The second end of the cage floor is positioned at the second end of the main body. The first end of the cage floor is spaced away from the first end of the main body to thereby divide the concave interior into a capture area towards the second end of the main body and a pathway into the capture area towards the first end of the main body. The edge of the main body and the first end of the cage floor define a downward facing opening to the pathway that can be positioned overtop an opening to a burrow. The burrowing animal trap can further include a capture mechanism that includes a trap door that transitions between a set position in which the trap door does not block the pathway into the capture area and a triggered position in which the trap door blocks the pathway into the capture area.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1A:
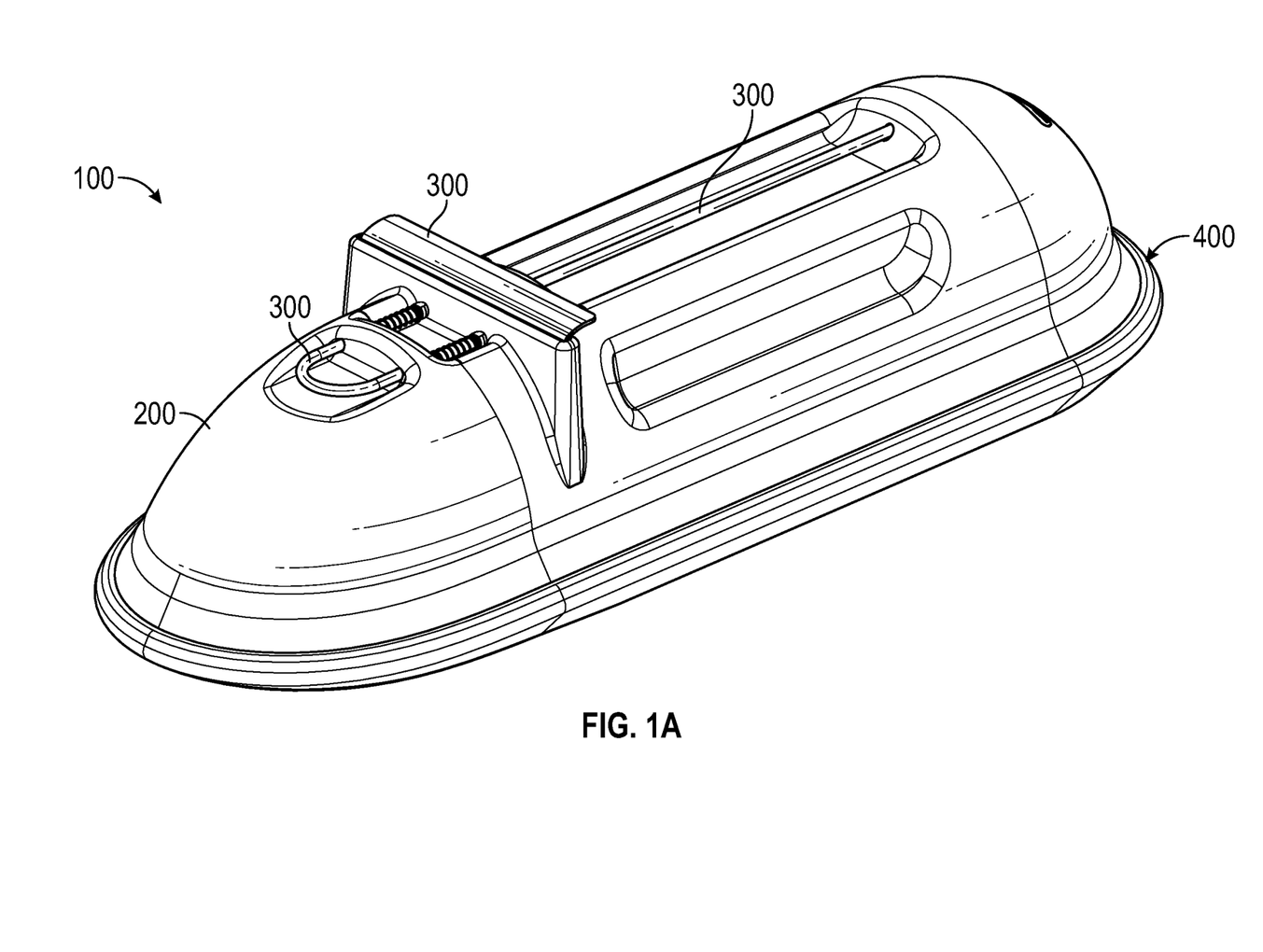
FIG. 1A illustrates a burrowing animal trap that is configured in accordance with one or more embodiments of the present invention.
Figure 1B:
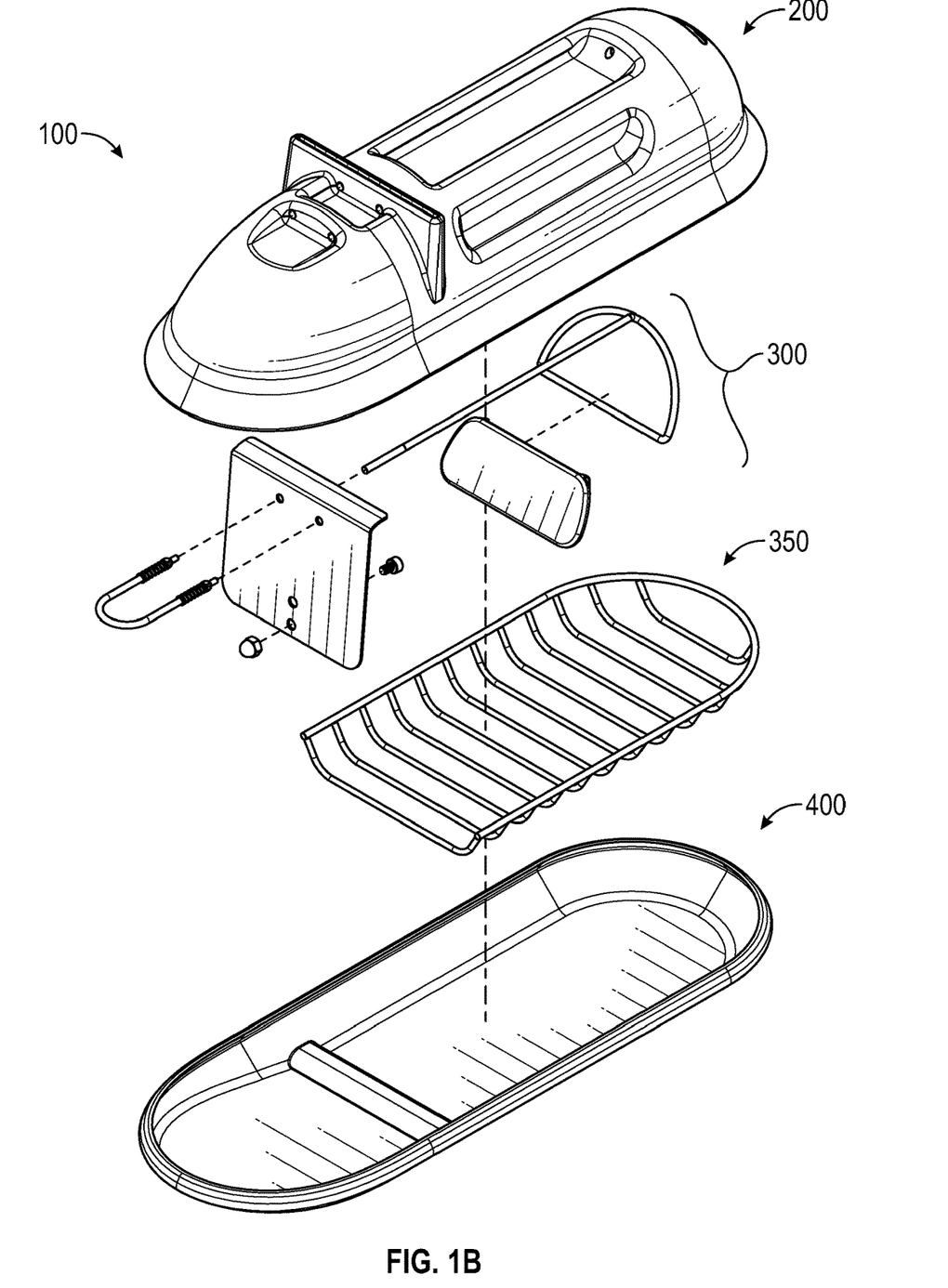
FIG. 1B provides an exploded view of the burrowing animal trap.

FIGS. 1A and 1B provide assembled and exploded views respectively of a burrowing animal trap (or trap) 100 that is configured in accordance with one or more embodiments of the present invention. Trap 100 includes a main body 200, a capture mechanism 300, a cage floor 350 and a cover 400. Main body 200 can preferably be formed of an opaque material that prevents light from entering trap 100 (e.g., ABS plastic or metal). Cage floor 350 is coupled to main body 200 to define a capture area of trap 100. Capture mechanism 300 functions to enclose the capture area when an animal enters therein. Cover 400, which may be optional in some embodiments, can be secured to main body 200 to isolate an animal that has been captured within trap 100.

Figure 2A:
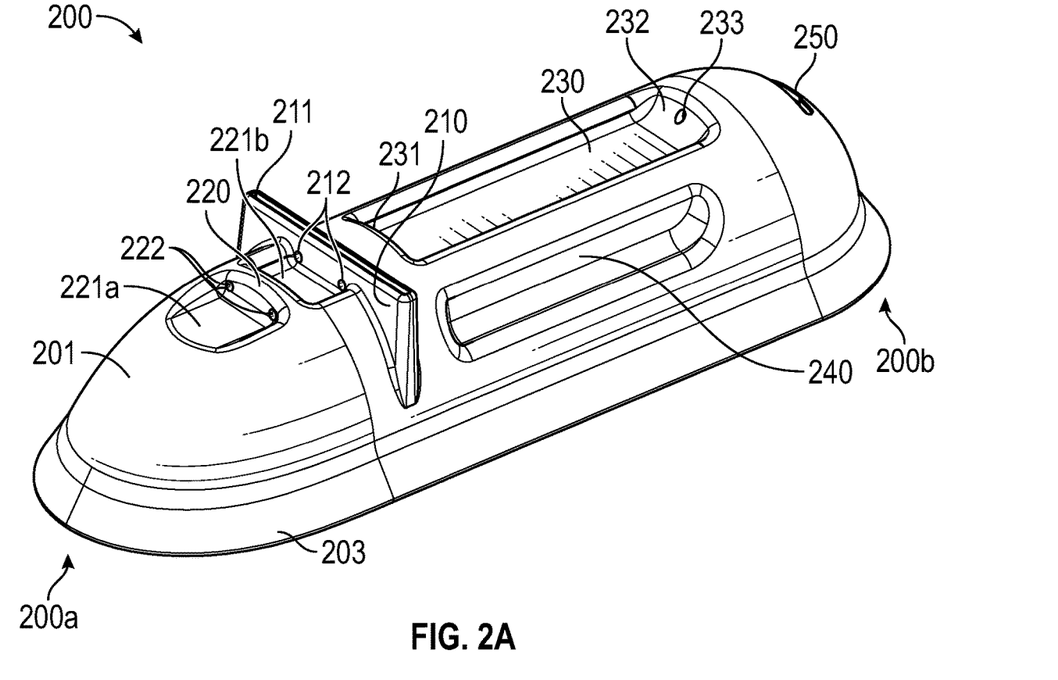
FIGS. 2A-2E provide different views of a main body of the burrowing animal trap.
Figure 2B:
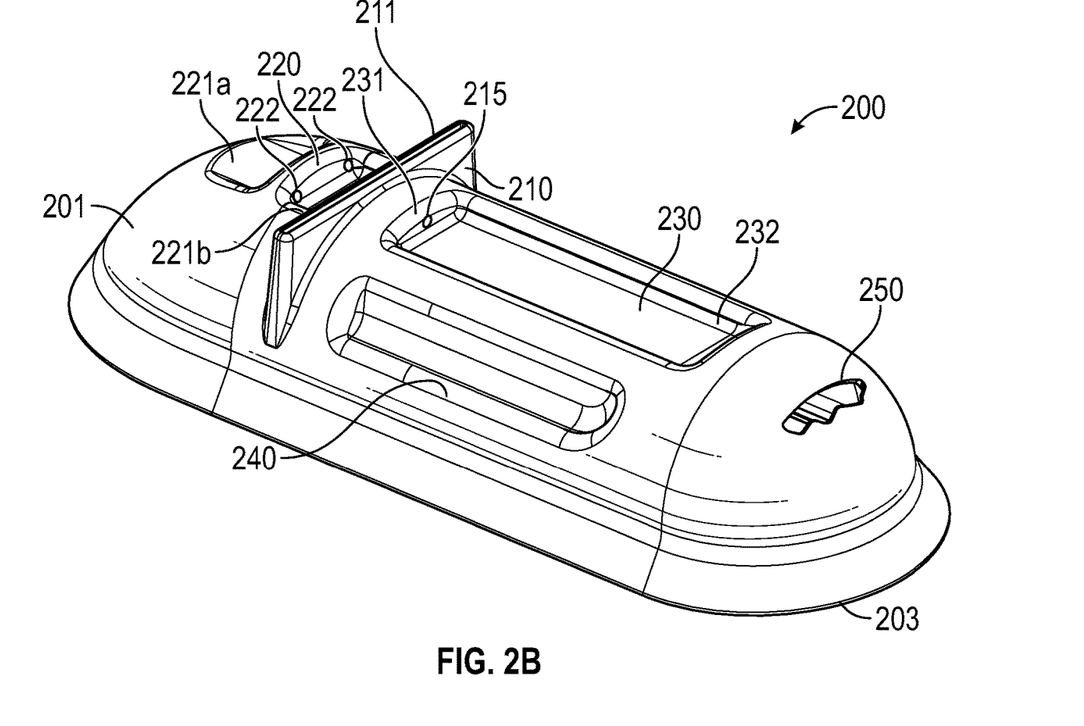
Figure 2C:
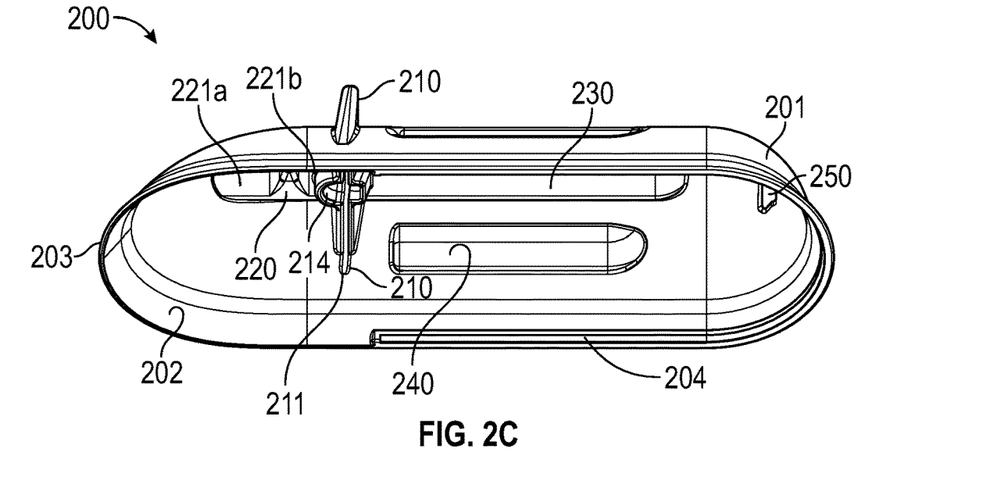
Figure 2D:
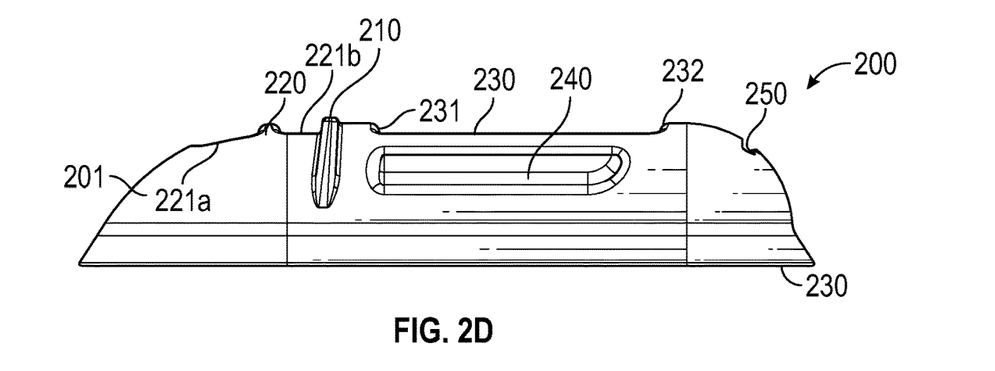

FIGS. 2A-2E provide various views of main body 200 in isolation. Main body 200, which has a generally concave shape, includes an outer surface 201 and an inner surface 202 that are separated by an edge 203. In a typical use case, edge 203 will be oriented downward towards the ground. In some embodiments, such as is shown in FIG. 2D, the entirety of edge 203 can extend along the same plane. However, edge 203 may equally have a varying profile. A channel 204 can be formed in inner surface 202 along a portion of edge 203. Channel 204 can function to receive and secure cage floor 350 as further described below. Although not shown, in some embodiments, main body 200 may include an inner lip that is adjacent to and spaced inwardly from edge 203. Such an inner lip can function to provide a multi-layer interface with soil to better prevent light, air, sound or other sensory cues from passing under main body 200 when trap 100 is deployed.

Main body 200 can include a trap door housing 210 that is positioned towards a first end 200a of main body 200. In some embodiments, trap door housing 210, which may have a generally rectangular shape, can extend upwardly beyond outer surface 201 and downwardly beyond inner surface 202 (e.g., to form a reinforcing structure within main body 200). As depicted, trap door housing 210 may extend across a width of main body 200. However, in some embodiments, trap door housing 210 may include opposing portions (e.g., ribs) on each side of main body 200. A trap door channel 211 is formed in and extends vertically through trap door housing 210. In some embodiments, a trap door retaining member area 214 can be formed at the bottom of trap door housing 210. One or more locking member holes 212 and a trigger rod hole 215, which will be described in greater detail below, may also be formed through trap door housing 210.

A pair of locking member recessed surfaces 221a and 221b separated by a locking member retaining ridge 220 are formed in main body 200 towards first end 200a and adjacent to trap door housing 210. One or more locking member holes 222 are formed in locking member retaining ridge 220 and extend between locking member recessed surfaces 221a and 221b. Locking member holes 212, which can align with locking member holes 222, extend from locking member recessed surface 221b into trap door channel 211.

A trigger rod recessed surface 230, which includes a first endwall 231 towards first end 200a and a second endwall 232 towards a second end 200b of main body 200, is formed in main body 200 adjacent to trap door housing 210 and towards second end 200b of main body 200. Trigger rod hole 215 extends through first endwall 231 and into trap door channel 211. Another trigger rod hole 233, which is aligned with trigger rod hole 215, extends through second endwall 232 and into the interior of main body 200.

Figure 2E:
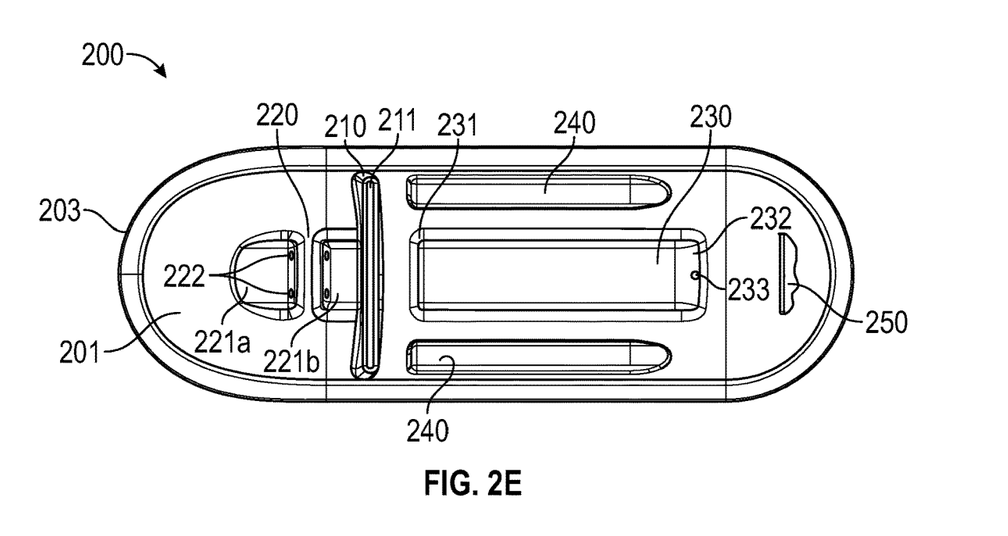

Main body 200 may also include handles 240 which are formed as recessed surfaces in opposing sides of outer surface 201. However, other types of handles, including those that are not formed within main body 200, could also be used. An opening 250 is formed through main body 200 towards second end 200b. Opening 250 can function to allow light and air into the interior of main body 200. In some embodiments, opening 250 may be the only opening into the capture area (other than the various holes). As best seen in FIG. 2E, an upper edge of opening 250 may have a consistent, curving shape whereas a lower edge of opening 250 may have a crooked shape. The consistent, curving shape of the upper edge is intended to simulate a burrow opening while the crooked shape of the lower edge is intended to simulate the random profile of the soil surrounding the burrow opening. However, opening 250 may have any shape.

Figure 3A:
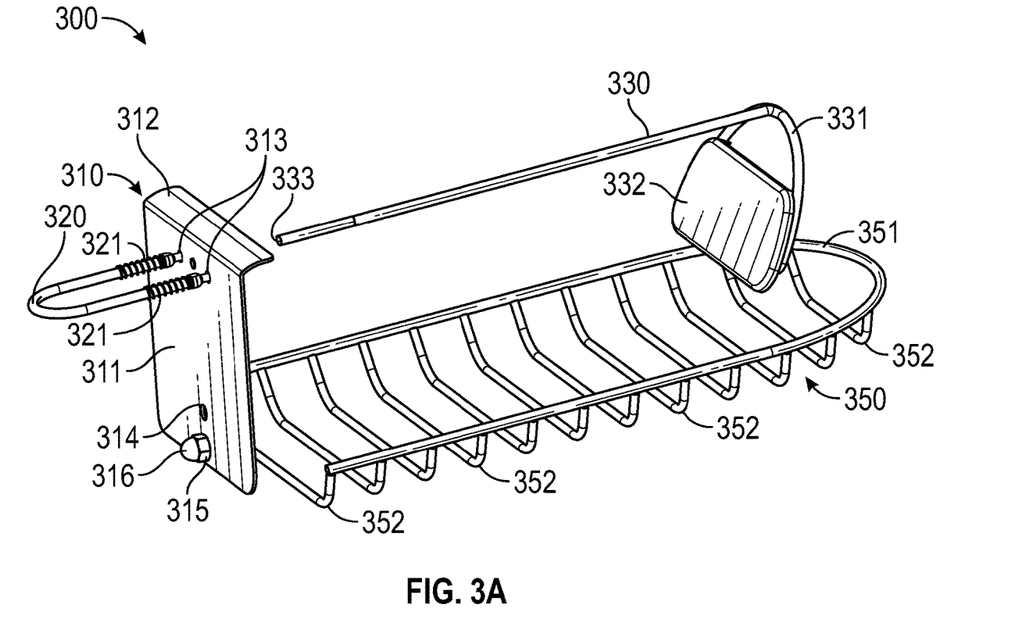
FIGS. 3A and 3B illustrate a capture mechanism of the burrowing animal trap in a set position and a triggered position respectively.
Figure 3B:
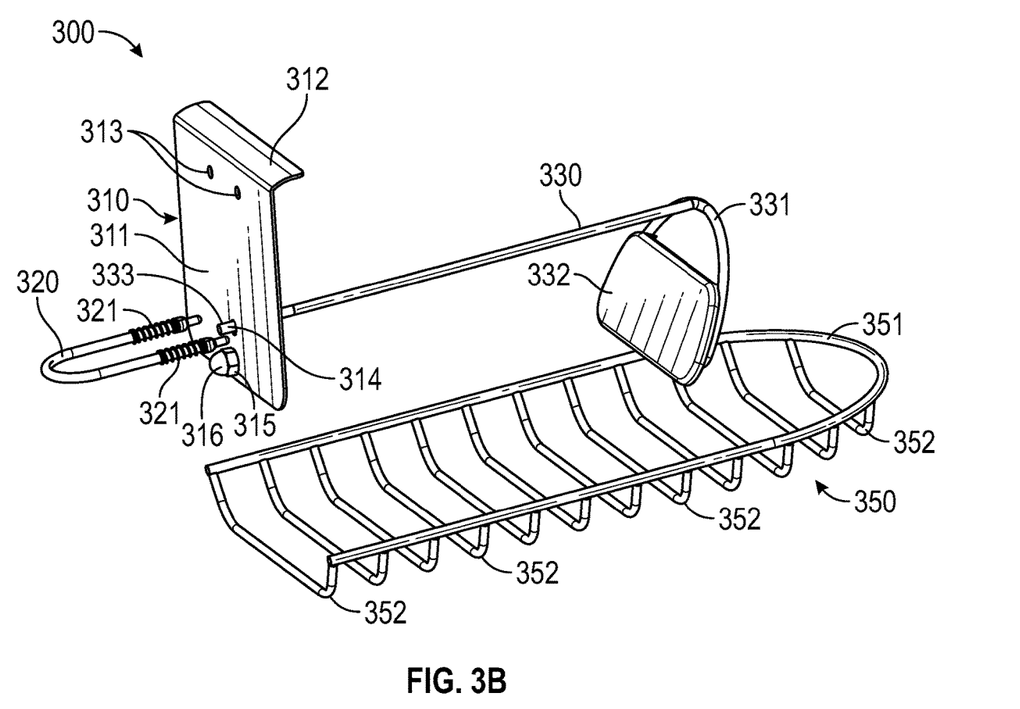

FIGS. 3A and 3B illustrate capture mechanism 300 in isolation when in the triggered and set positions respectively. Capture mechanism 300 includes a trap door 310 that has a capturing portion 311 and an actuating portion 312. Capturing portion 311 can be sized to fit within trap door channel 211 and functions to enclose the capture area of trap 100 when capture mechanism 300 is triggered. Actuating portion 312, which may encompass an angled top portion of trap door 310, a separate component attached to trap door 310 or any other suitable component, is intended to remain outside main body 200 when capture mechanism 300 is triggered. For example, actuating portion 312 may contact outer surface 201 and/or trap door housing 210 to limit the downward movement of trap door 310. Actuating portion 312 may also provide a surface by which a user can lift trap door 310 to place capture mechanism 300 in the set position.

A trap door retaining member 316 may be formed in, coupled to or otherwise provided on a bottom of capturing portion 311. In the depicted embodiments, trap door retaining member 316 is in the form of a cap screw and an acorn nut that are secured to trap door 310 via an opening 315. Trap door retaining member 316 can interface with trap door retaining member area 214 to prevent trap door 310 from being pulled out from trap door channel 210. For example, in the depicted embodiments, trap door retaining member area 214 is in the form of an opening that receives the cap screw and acorn nut of trap door retaining member 316.

One or more locking member holes 313 and a trigger rod hole 314 are also formed through trap door 310. Locking member holes 313 can be positioned so that they will align with locking member holes 212 and 222 when trap door 310 is lowered into the triggered position (FIG. 3A). Similarly, trigger rod hole 314 can be positioned to align with trigger rod hole 215 when trap door 310 is lifted into the set position (FIG. 3B).

Capture mechanism 300 also includes locking member 320 which, as depicted, includes two prongs which form a U-shape. However, a locking member having a different shape could equally be used. For example, a locking member having a single prong could be used, in which case, only a single locking member hole 212, 222 and 313 could be provided. One benefit of employing a locking member with two prongs is that locking member holes 212, 222 and 313 can be naturally offset from trigger rod hole 314 to prevent locking member 320 from entering trigger rod hole 314.

As is shown in FIG. 1A, the prongs of locking member 320 extend through locking members holes 212 and 222. Springs 321 can be positioned around the prongs and within locking member recessed surface 221b so that locking member 320 is biased towards trap door channel 211. More particularly, springs 321 can be compressed between the endwall of locking member recessed surface 221b and an end 320a of locking member 320. In some embodiments, end 320a could be in the form of a nut that is secured to the prong of locking member 320. Accordingly, as represented in FIG. 3A, when trap door 310 is lowered and locking member 320 aligns with locking member holes 313, springs 321 will force locking member 320 into locking member holes 313. The portion of locking member 320 that is positioned within locking member recessed surface 221a can enable a user to pull locking member 320 from locking member holes 313.

Capture mechanism 300 also includes a trigger rod 330 that forms or is otherwise coupled to a trigger surface 331. Trigger surface 331 is contained within the capture area of trap 100 towards second end 200b, while trigger rod 330 extends through trigger rod hole 233, along trigger rod recessed surface 230, through trigger rod hole 215 and into trap door channel 211. When trap door 310 is pulled upwardly into the set position, trigger rod hole 314 in trap door 310 will align with trigger rod holes 215 and 233 thereby allowing end 333 of trigger rod 330 to insert into trigger rod hole 314 to retain trap door 310 in the set position. In some embodiments, end 333 may be formed of or include a non-slip material (e.g., a rubber coating) to prevent trigger rod 330 from being inadvertently withdrawn from trigger rod hole 314. In some embodiments, end 333 may be formed with a slippery material to reduce friction and thereby enable actuation with lower forces. In some embodiments, end 333 may have a distinctive color so that it can be readily seen whether capture mechanism 300 is in the set or triggered position.

In some embodiments, trigger surface 331 can be formed with a trigger plate 332 that snaps within a loop formed from an extension of trigger rod 330. However, trigger surface 331 could be configured in any suitable way. For example, trigger surface 331 could be formed using a component that is entirely separate from but attached to trigger rod 330 or could be formed entirely of an extension of trigger rod 330 (e.g., by forming the extension of trigger rod 330 into concentric circles).

FIGS. 3A and 3B also illustrate the position of cage floor 350 relative to capture mechanism 300 when in the set and triggered positions respectively. Cage floor 350 may include an outer member 351 that can be shaped to match channel 204 and a number of cross members 352 that are spaced apart and extend widthwise between opposing sides of outer member 204. Outer member 351 can be snapped into channel 204 to thereby secure cage floor 350 to main body 200. However, any other suitable mechanism could also be used to secure cage floor 350 to main body 200 including, for example, over-molding, mechanical fasteners, adhesives, etc.

Cross members 352 can extend downwardly from outer member 351 so that they are positioned below edge 203 of main body. This will allow cross members 352 to be buried in soil (or other material) when trap 100 is deployed as described below. Cross members 352 can be spaced sufficiently to facilitate their entry into the soil while not providing a gap large enough to enable a captured animal to escape. Notably, cage member 350 is configured to extend only partially along the length of main body 200 so that a length of main body 200 toward first end 200a is not encompassed by cage member 350. In some embodiments, cage member 350 may be configured to extend up to but not beyond trap door 310.

Figure 4A:
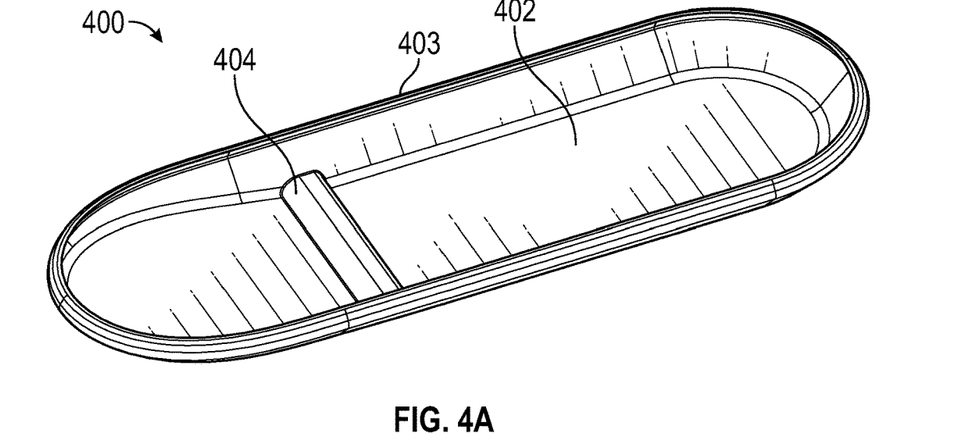
FIGS. 4A and 4B illustrate different views of a cover of the burrowing animal trap.
Figure 4B:
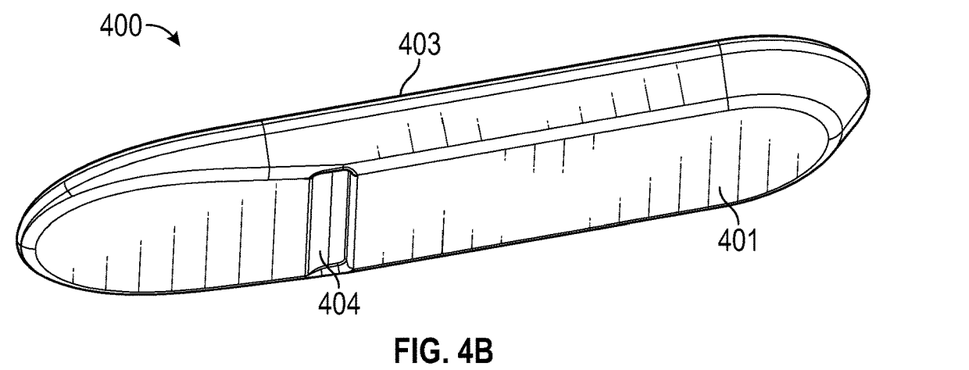

FIGS. 4A and 4B provide a top and bottom view respectively of cover 400. Cover 400 includes an outer surface 401 and an inner surface 402 that are separated by an edge 403. Edge 403 can be inwardly oriented so that it may snap overtop edge 203 of main body 200 to thereby secure cover 400 over inner surface 202 of main body 200. Cover 400 may have an upwardly facing concave shape to accommodate cage member 350. Cover 400 may be formed of a transparent or translucent material so that a captured animal may be visible when cover 400 is attached to main body 200. This will allow the user to verify the wellbeing of the captured animal.

Figure 4C:
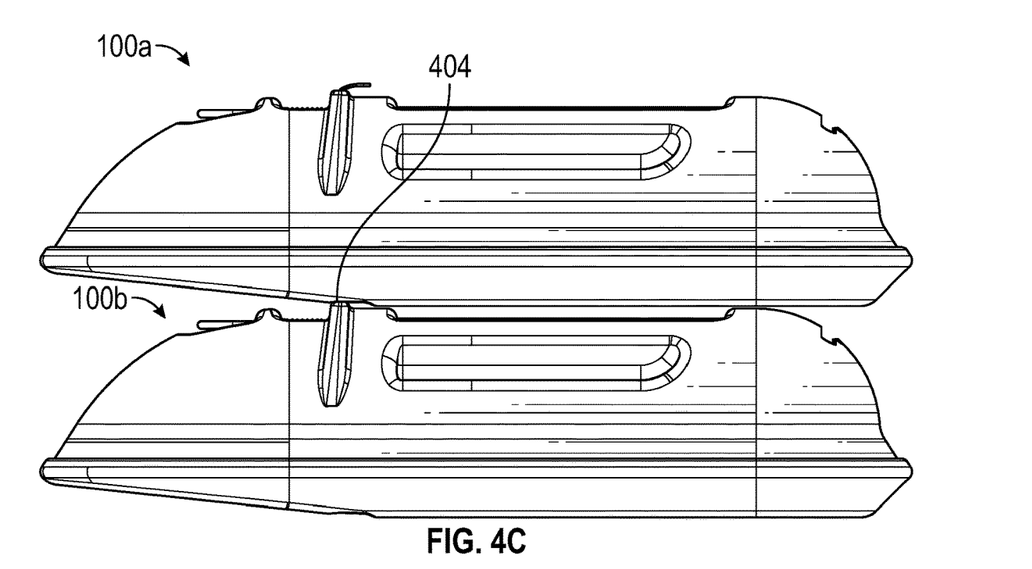
FIG. 4C illustrates two stacked burrowing animal traps.

In some embodiments, a recessed slot 404 may be formed in outer surface 401 and may be configured to receive actuating portion 312 to enable multiple traps 100 to be stacked. For example, FIG. 4C shows that a first trap 100a is stacked on a second trap 100b by positioning recessed slot 404 of first trap 100a over actuating portion 312 of second trap 100b. Because of recessed slot 404, both first and second traps 100a and 100b can be maintained in a horizontal orientation when stacked which can facilitate storing and transporting the traps.

Figure 5A:
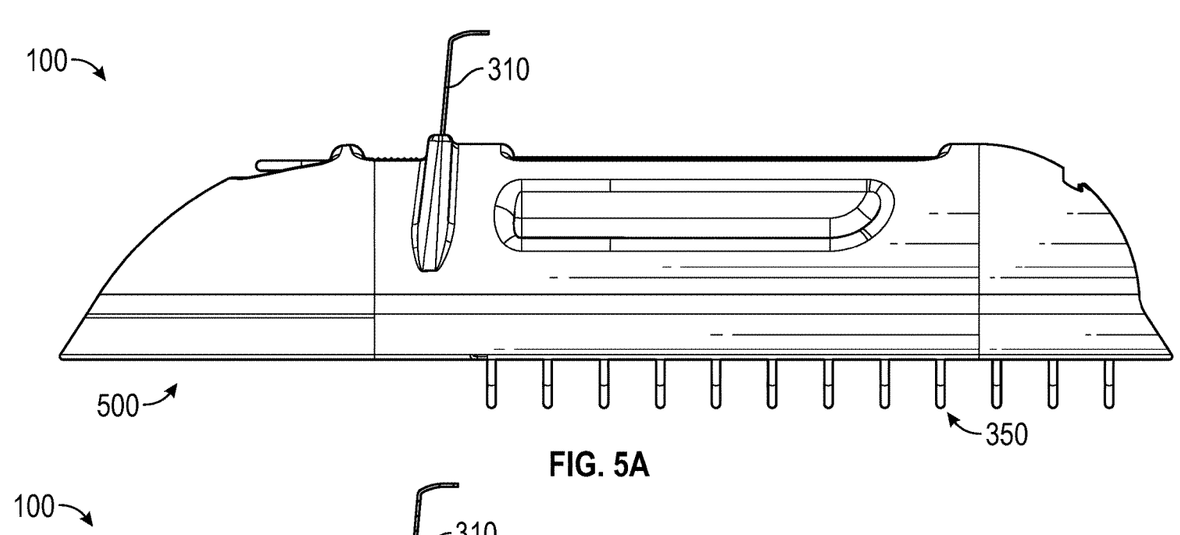
FIGS. 5A and 5B provide side and cross-sectional side views respectively of the burrowing animal trap when set.
Figure 5B:
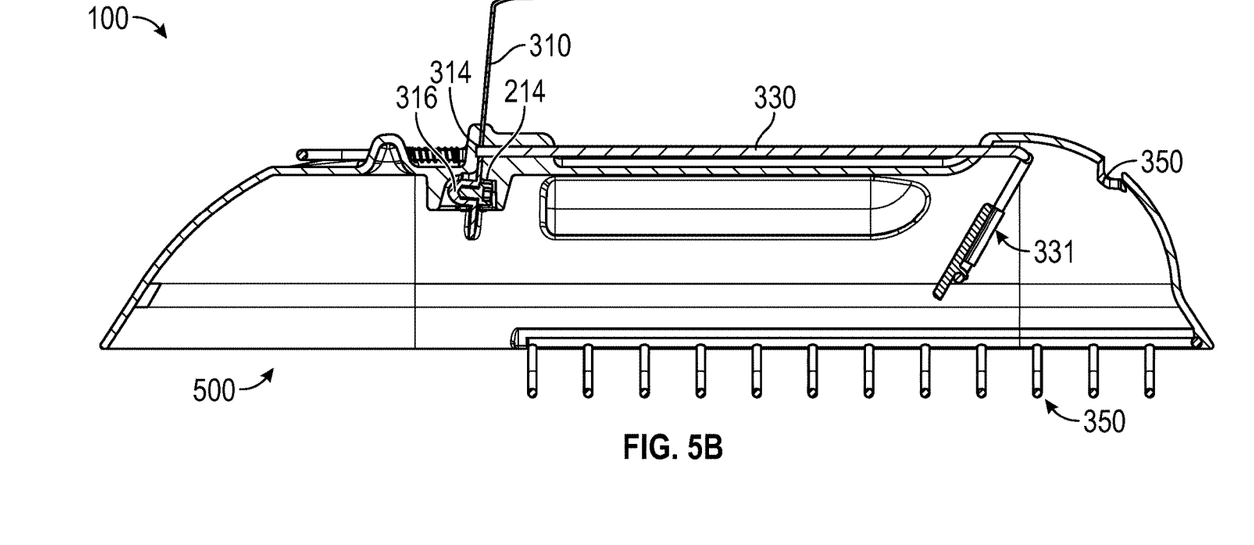
Figure 5C:
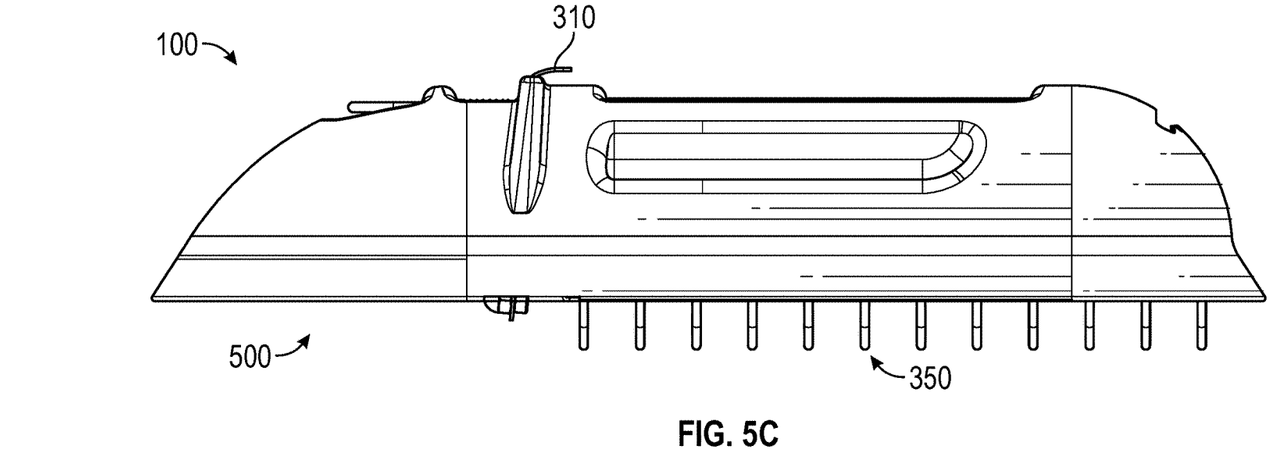
FIGS. 5C and 5D provide side and cross-sectional side views respectively of the burrowing animal trap when triggered.
Figure 5D:
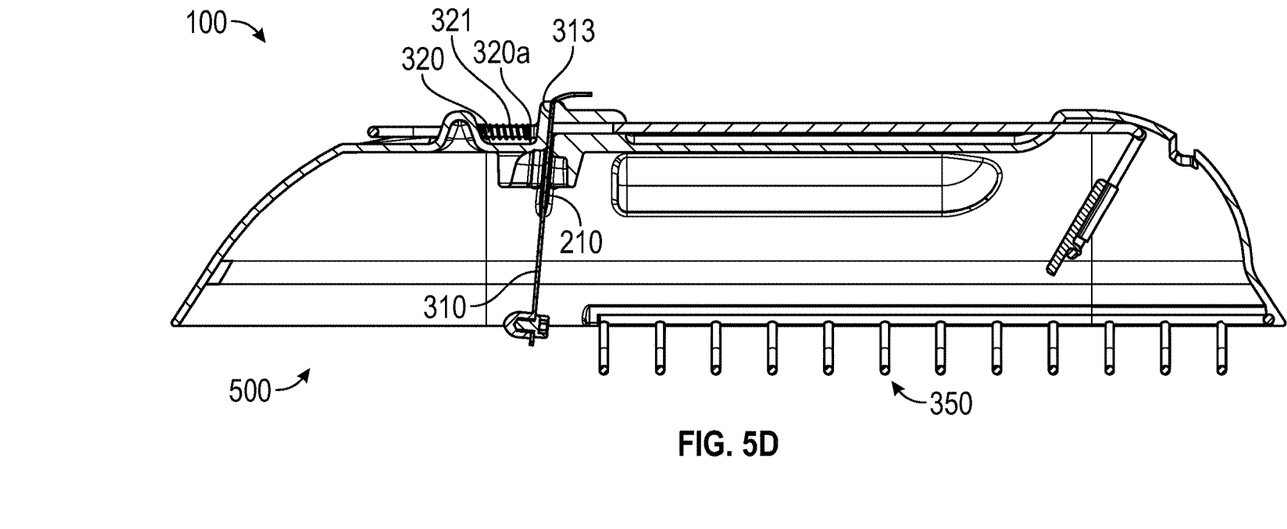

FIGS. 5A and 5B provide side and cross-sectional side views respectively which show trap 100 in the set position. In contrast, FIGS. 5C and 5D provide side and cross-sectional side views respectively which show trap 100 in the triggered (or unset) position. When in the set position, trap door 310 is raised to the point where trigger rod hole 314 is aligned with trigger rod hole 215 so that a user can insert end 333 of trigger rod 330 into trigger rod hole 314. With end 333 positioned within trigger rod hole 314, trigger rod 330 will retain trap door 310 in this set position. As shown in FIG. 5B, when trap 100 is in the set position, a pathway 500 into the capture area will exist.

Trap 100 will remain in this set position until an animal applies a sufficient force against trigger plate 331 to cause end 333 of trigger rod 330 to be pulled from trigger rod hole 314 thereby allowing trap door 310 to fall. In this triggered position, trap door 310 will block pathway 500 so that the animal cannot escape from the capture area. Even if the animal presses upwardly against trap door 310, the biasing force of springs 321 will retain locking member 320 within locking member holes 313 to prevent the animal from lifting trap door 310. Also, because trap door channel 210 extends downwardly beyond inner surface 202, it will function to reinforce trap door 310 if the animal presses against it in a direction towards first end 200a. More particularly, trap door channel 210 can prevent trap door 310 from pivoting which would otherwise increase the gap between the bottom of trap door 310 and the end of cage floor 350. As mentioned above, cage floor 350 may extend up to but not beyond trap door 310 so that the width of pathway 500 is maximized without creating too large of a gap between trap door 310 and cage floor 350.

Figure 6:
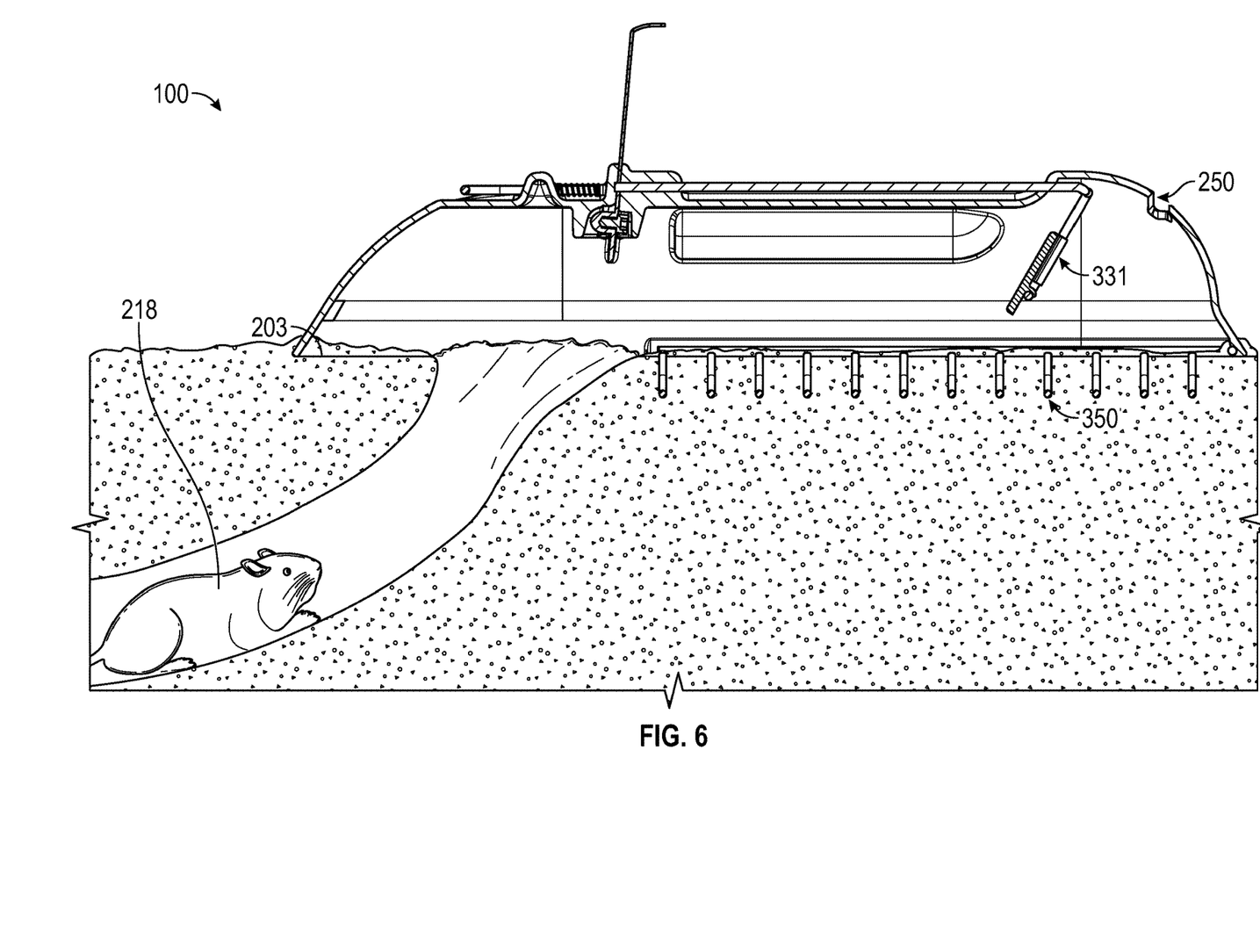
FIG. 6 represents the burrowing animal trap in use.

FIG. 6 illustrates how trap 100 can be used over a burrow. As shown, trap 100 can be placed overtop the opening of the burrow so that cage floor 350 and edge 203 surround the opening. Cage floor 350 can be pressed down into the soil so that it is not visible to the animal. With cage floor 350 pressed into the soil, edge 203 will rest on the soil so that the opening of the burrow is largely sealed off. In some cases, it may also be advantageous to bury at least a portion of edge 203 in soil to prevent light from passing under trap 100. As mentioned above, main body 200 can be formed of an opaque material that prevents light from passing there through. Accordingly, light will only enter the interior of trap 100 via opening 250. Since opening 250 is relatively small, the interior of trap 100 will remain dark even when trap 100 is placed in direct sunlight.

Due to the position of opening 250 behind trigger surface 331, the animal will be led to believe that opening 250 is the opening of the burrow. As the animal passes into trap 100, the presence of soil on the floor—which is possible due to the use of cage floor 350—will prevent the animal from realizing that it is inside trap 350. As a result, the animal will likely continue towards the light that is entering through opening 250 until it runs into trigger surface 331. Alternatively, the animal may attempt to push soil into opening 250 under the belief that it is sealing the opening of the burrow. In either case, the animal's contact with or the force of the soil against trigger surface 331 will pull trigger rod 330 from trigger rod hole 314 thereby allowing trap door 310 to fall and capture the animal. Because trap door 310 falls under the force of gravity, as opposed to being forced down by some mechanical structure, there is little risk that the animal will be harmed.

Once the animal is captured, the design of trap 100 will secure and protect the animal until the user can release it in a desired location. For example, the dark interior that trap 100 provides may lead the animal to believe that it is still within its burrow thereby minimizing any panic the animal might experience. The opaque material of main body 200 may also prevent temperatures within trap 100 from reaching harmful levels. In some embodiments, outer surface 201 may be white or reflective to further minimize the temperature within trap 100. The fully enclosed design of trap 100 may also prevent predators from detecting and/or accessing the captured animal.

When the user desires to release the animal, he or she can lift trap 100 from the soil and place cover 400 around edge 203 to seal the interior of trap 100. This will prevent contact with the animal while also containing any soil or feces within trap 100. To release the animal, the user can simply remove cover 400 (if cover 400 was attached), pull on locking member 320 and lift trap door 310. The animal may then escape through pathway 500.

A trap configured in accordance with embodiments of the present invention may include a number of variations from what has been described. For example, a trap door could be configured to pivot rather than fall into the triggered position. In such cases, a top portion of the trap door could be secured to an axle that extends across the width of main body 200 to thereby allow the trap door to pivot towards first end 200a to reach the set position. In the set position, trigger rod 330 could be inserted under the trap door to hold it in this set position. Once triggered, trigger rod 330 will be pulled back to allow the trap door to fall in a pivoting manner towards the capture area. Locking member 320 could function in the same manner as described above to secure the trap door in the triggered position.

A trap door could also be configured to rotate between the set and triggered positions. In such cases, the trap door may have a circular shape and may be secured to trap door housing 210 via a pivot point towards one edge of the circular shape. In much the same manner as described above, this rotating trap door could be lifted into the set position and held in the set position by inserting trigger rod 330 into a trigger rod hole. Likewise, the rotating trap door could be maintained in the triggered position due to locking member 320 inserting into locking member holes 313.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A burrowing animal trap comprising:
a main body having an outer surface, an inner surface and an edge that separates the outer surface from the inner surface, the edge extending fully around the main body along a horizontal plane such that the inner surface forms a downwardly-oriented concave interior of the main body that is fully enclosed when the edge is oriented downwardly and positioned against the ground, the main body having a first end and a second end opposite the first end;
a cage floor coupled to the main body over the concave interior, the cage floor having a first end and a second end, the second end of the cage floor being positioned at the second end of the main body, the first end of the cage floor being spaced away from the first end of the main body to thereby divide the concave interior into a capture area towards the second end of the main body and a pathway into the capture area towards the first end of the main body, wherein the edge of the main body and the first end of the cage floor define a downward facing opening to the pathway; and
a capture mechanism that includes a trap door that transitions between a set position in which the trap door does not block the pathway into the capture area and a triggered position in which the trap door blocks the pathway into the capture area.

2. The burrowing animal trap of claim 1, wherein a trap door housing is positioned towards the first end of the main body from the first end of the cage floor.

3. A burrowing animal trap comprising:
- a main body formed of an opaque material, the main body having an outer surface, an inner surface and an edge that separates the outer surface from the inner surface, the edge extending fully around the main body along a plane such that the inner surface forms a downwardly-oriented concave interior of the main body that is fully enclosed when the edge is oriented downwardly and positioned against the ground, the edge defining an opening into the concave interior, the main body having a first end and a second end opposite the first end, wherein the opaque material from which the main body is formed inhibits light from passing into the concave interior when the edge is positioned against the ground, the positioning of the edge against the ground also inhibiting the light from passing under the edge and into the concave interior;
- a cage floor coupled to the main body over the concave interior, the cage floor extending from the second end of the main body towards the first end of the main body to thereby divide the concave interior into a capture area towards the second end of the main body and a pathway into the capture area towards the first end of the main body, wherein the edge of the main body and the first end of the cage floor define a downward facing opening to the pathway; and
- a capture mechanism that includes a trap door that transitions between a set position in which the trap door does not block the pathway into the capture area and a triggered position in which the trap door blocks the pathway into the capture area.

4. The burrowing animal trap of claim 3, wherein no portion of the edge deviates from the plane.

5. The burrowing animal trap of claim 3, wherein the main body includes an opening at the second end that is spaced apart from the edge and that allows light to pass into the concave interior.

6. The burrowing animal trap of claim 3, wherein the main body includes a trap door housing within which the trap door transitions between the set position and the triggered position.

7. The burrowing animal trap of claim 6, wherein the trap door housing is vertically oriented such that the trap door moves vertically between the set position and the triggered position.

8. The burrowing animal trap of claim 7, wherein the trap door falls under the force of gravity from the set position to the triggered position.

9. The burrowing animal trap of claim 6, wherein the capture mechanism includes a locking member that maintains the trap door in the triggered position.

10. The burrowing animal trap of claim 9, wherein the locking member is positioned outside the main body but inserts through the trap door housing to interface with the trap door to thereby maintain the trap door in the triggered position.

11. The burrowing animal trap of claim 6, wherein the capture mechanism includes a trigger rod that maintains the trap door in the set position.

12. The burrowing animal trap of claim 11, wherein the trigger rod is positioned outside the main body but inserts through the trap door housing to interface with the trap door to thereby maintain the trap door in the set position.

13. The burrowing animal trap of claim 11, wherein the capture mechanism includes a trigger surface that is coupled to the trigger rod, the trigger surface being positioned within the capture area towards the second end of the main body.

14. The burrowing animal trap of claim 13, wherein the trigger surface is coupled to the trigger rod such that a force against the trigger surface that is towards the second end of the main body causes the trigger rod to be withdrawn from the trap door housing.

15. The burrowing animal trap of claim 3, wherein the cage floor includes cross members that are positioned below the edge of the main body.

16. The burrowing animal trap of claim 3, wherein the trap door is spaced towards the first end of the main body from the cage floor.

17. The burrowing animal trap of claim 3, further comprising:
- a cover that attaches to the edge of the main body to thereby enclose the concave interior.

18. The burrowing animal trap of claim 17, wherein the trap door includes an actuating portion that is positioned outside the main body when the trap door is in the triggered position, and wherein the cover includes a recessed surface that is configured to receive the actuating portion to thereby enable multiple burrowing animal traps to be stacked.

19. A burrowing animal trap comprising:
- a main body formed of an opaque material, the main body having an outer surface, an inner surface and an edge that separates the outer surface from the inner surface, the edge extending fully around the main body along a plane such that the inner surface forms a downwardly-oriented concave interior of the main body that is fully enclosed when the edge is oriented downwardly and positioned against the ground, the main body having a first end and a second end opposite the first end, wherein the opaque material from which the main body is formed prevents light from passing into the concave interior when the edge is positioned against the ground, the positioning of the edge against the ground also inhibiting light from passing under the edge and into the concave interior, the main body having an opening at the second end that is spaced from the edge and that allows light to pass into the concave interior;
- a cage floor coupled to the main body over the concave interior, the cage floor having a first end and a second end, the second end of the cage floor being positioned at the second end of the main body, the first end of the cage floor being spaced away from the first end of the main body to thereby divide the concave interior into a capture area towards the second end of the main body and a pathway into the capture area towards the first end of the main body, wherein the edge of the main body and the first end of the cage floor define a downward facing opening to the pathway that can be positioned overtop an opening to a burrow; and
- a capture mechanism that includes a trap door that transitions between a set position in which the trap door does not block the pathway into the capture area and a triggered position in which the trap door blocks the pathway into the capture area.

20. The burrowing animal trap of claim 19, wherein the capture mechanism includes a trigger rod that maintains the trap door in the set position and a locking mechanism that maintains the trap door in the triggered position.

* * * * *